US009811628B1

(12) United States Patent
Park et al.

(10) Patent No.: US 9,811,628 B1
(45) Date of Patent: Nov. 7, 2017

(54) METAL CONFIGURABLE REGISTER FILE

(71) Applicant: BaySand Inc., Morgan Hill, CA (US)

(72) Inventors: Jonathan C. Park, Morgan Hill, CA (US); Yau Kok Lai, Penang (MY); Teck Siong Ong, Penang (MY); Yin Hao Liew, Penang (MY)

(73) Assignee: BaySand Inc., Morgan Hill, CA (US)

( * ) Notice: Subject to any disclaimer, the term of this patent is extended or adjusted under 35 U.S.C. 154(b) by 0 days.

(21) Appl. No.: 15/294,585

(22) Filed: Oct. 14, 2016

(51) Int. Cl.
G06F 17/50 (2006.01)

(52) U.S. Cl.
CPC .................. G06F 17/5077 (2013.01)

(58) Field of Classification Search
CPC .................................. G06F 17/5077
USPC .......................................... 716/126
See application file for complete search history.

(56) References Cited

U.S. PATENT DOCUMENTS

| 8,533,641 | B2 | 9/2013 | Park et al. |
| 8,875,080 | B1 | 10/2014 | Parks et al. |
| 2011/0041109 | A1* | 2/2011 | Kengeri ............ G06F 17/5045 716/108 |
| 2011/0213952 | A1 | 9/2011 | Pechanek et al. |
| 2013/0145131 | A1 | 6/2013 | Bloomfield et al. |
| 2014/0247525 | A1 | 9/2014 | Parks et al. |
| 2015/0048425 | A1 | 2/2015 | Park et al. |
| 2015/0109045 | A1* | 4/2015 | Vilangudipitchai H03K 19/018528 327/333 |
| 2015/0143309 | A1* | 5/2015 | De Dood ............ G06F 17/5068 716/107 |
| 2015/0206559 | A1 | 7/2015 | Priel et al. |

* cited by examiner

Primary Examiner — Suresh Memula
(74) Attorney, Agent, or Firm — Foley & Lardner LLP; Mark J. Danielson

(57) ABSTRACT

Embodiments of the invention relate to a configurable register file for inclusion in ASIC and other integrated circuit designs such as those based on metal configurable standard cell (MCSC) technology. According to certain general aspects, configurable register files provided by the present embodiments improve area, power and routing efficiencies and flexibility over conventional approaches such as hard memory macros and RTL designs. In embodiments, a configurable register file is implemented as a soft macro constructed from metal configurable standard cell (MCSC) base cells. According to certain aspects, unlike a hard memory macro, width and depth are not fixed and can be configured or programmed to any desired dimension or configuration. In some embodiments, a bit array of a configurable register file is comprised of register file bit cells. In other embodiments, a bit array of a configurable register file is comprised of ROM bit cells. In these and other embodiments, a configurable register file is constructed with a bit-line sharing approach that improves the routing and logic resource usage as compared to RTL based memory.

21 Claims, 17 Drawing Sheets

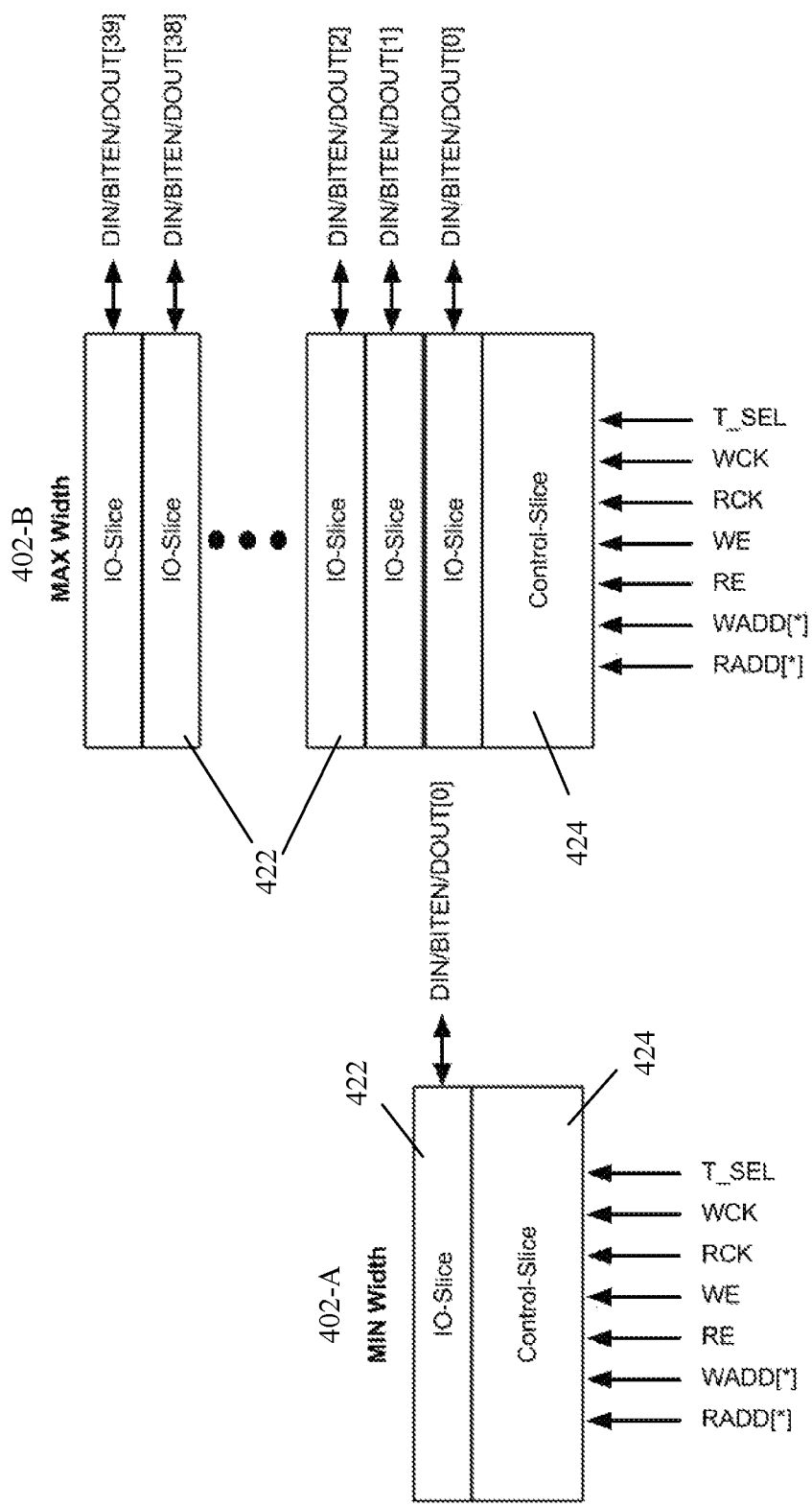

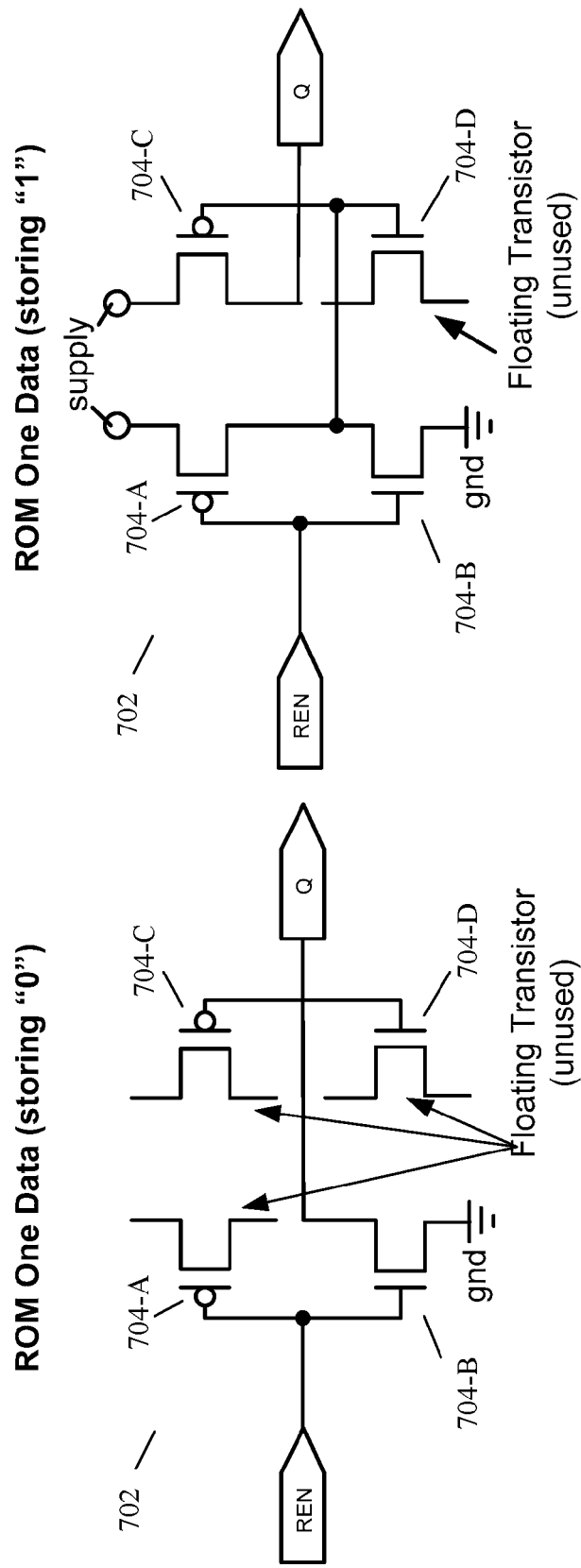

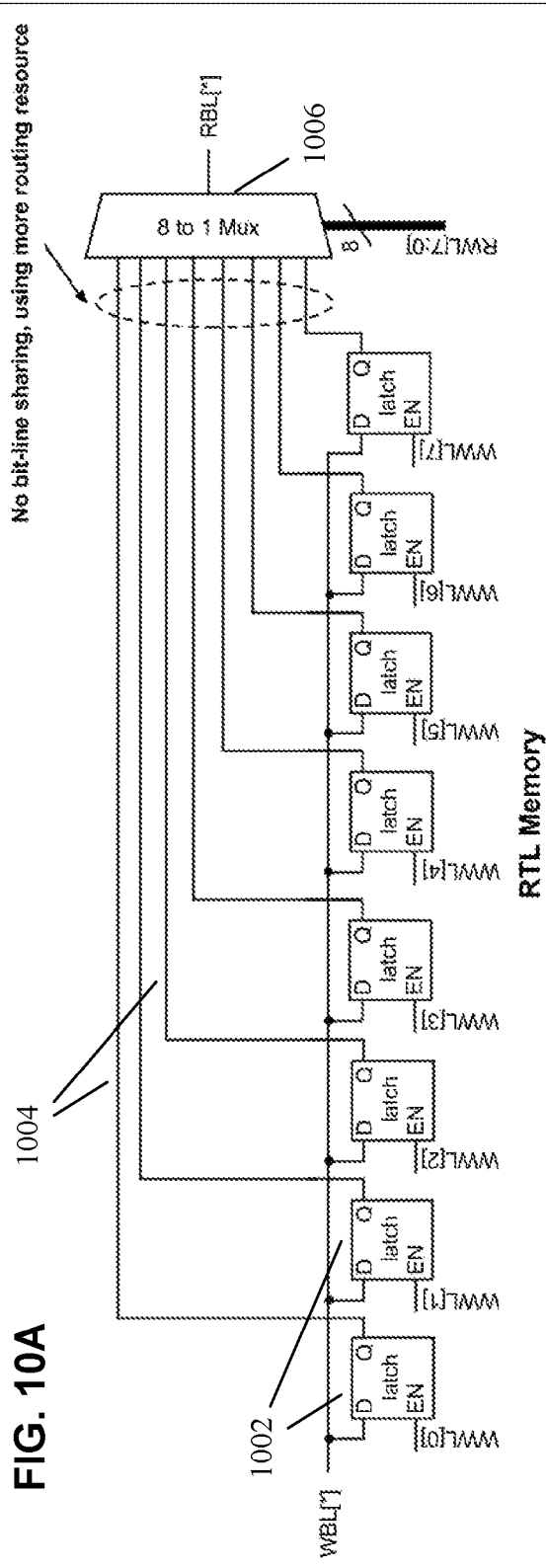
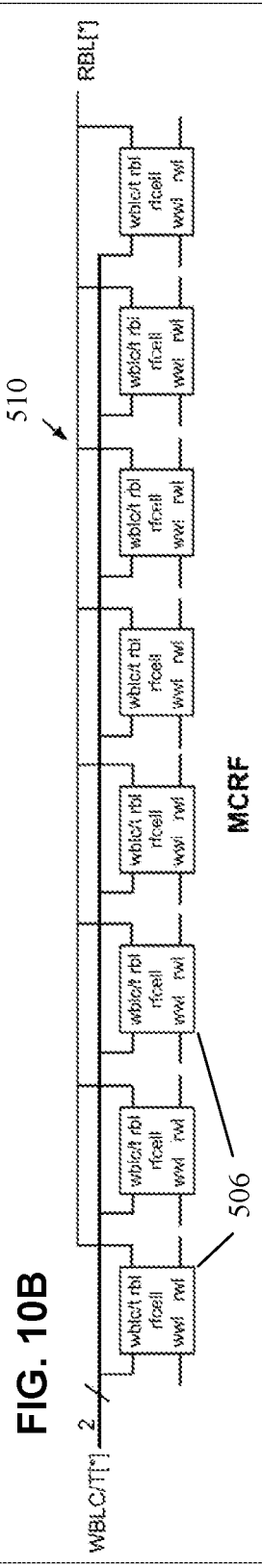
FIG. 10A
FIG. 10B

METAL CONFIGURABLE REGISTER FILE

FIELD OF THE INVENTION

The present invention relates generally to integrated circuits and more particularly, to configurable memory macros for use in integrated circuit designs such as structured ASIC designs or metal configurable ASIC designs.

BACKGROUND OF THE INVENTION

A metal configurable standard cell (MCSC) technology described in U.S. Pat. No. 8,533,641 has dramatically advanced the state of the art of highly integrated application specific integrated circuits (ASICs) and systems on chip (SOCs). In general, devices in accordance with this technology include "fixed" MCSC base cells formed from transistors in underlying layers of a wafer. These base cells can be connected together to form metal configurable standard cells (e.g. NAND gates, buffers, muxes, flip-flops, etc.) using overlying "programmable" metal layer regions that have electrical access to the underlying base cells. Any desired user logic can be further formed by connecting these standard cells together using the programmable metal layers through a conventional ASIC design implementation flow such as synthesis, place and route.

Certain challenges can arise when implementing memories in a metal configurable ASIC design such as an ASIC based on MCSC technology, given that the transistors are primarily fixed in size and pattern and ASIC may be implemented only by changing or configuring a few metal layers. Typically, memories are implemented in these designs using either a hard memory macro or synthesizable RTL. The hard memory macro may be pre-built with a certain memory size (e.g. 10 Kb). So implementing a smaller memory (e.g. 1 Kb) using a 10 Kb hard memory macro is neither area nor power efficient. Meanwhile, using RTL to implement such a memory block might not provide a good solution either as the RTL will synthesize to large array of flip-flops or latches. As a result, the area and power will grow exponentially as the design requirement of the memory increases.

Accordingly, a need remains for a solution to improve area, power, routing efficiency and flexibility when implementing memory in a metal configurable ASIC or similar design.

SUMMARY OF THE INVENTION

Embodiments of the invention relate to a configurable register file for inclusion in ASIC and other integrated circuit designs such as those based on metal configurable standard cell (MCSC) technology. According to certain general aspects, configurable register files provided by the present embodiments improve area, power and routing efficiencies and flexibility over conventional approaches such as hard memory macros and RTL designs. In embodiments, a configurable register file is implemented as a soft macro constructed from metal configurable standard cell (MCSC) base cells. According to certain aspects, unlike a hard memory macro, width and depth are not fixed and can be configured or programmed to any desired dimension or configuration. In some embodiments, a bit array of a configurable register file is comprised of register file bit cells. In other embodiments, a bit array of a configurable register file is comprised of ROM bit cells. In these and other embodiments, a configurable register file is constructed with a bit-line sharing approach that improves the routing and logic resource usage as compared to RTL based memory.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 4A and 4B are block diagrams of example implementations of a soft register file macro according to embodiments of the invention;

FIGS. 7A and 7B are schematic diagrams illustrating example implementations of ROM bit cells for storing a single bit of data in a configurable register file according to embodiments of the invention;

FIGS. 10A and 10B are schematic diagrams illustrating example aspects of bit line sharing according to embodiments of the invention;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, embodiments of the invention are directed to a configurable register file for a structured ASIC or similar integrated circuit having base cells or standard cells, and which can be implemented using soft macro techniques in an ASIC or similar design flow.

Figure 1:
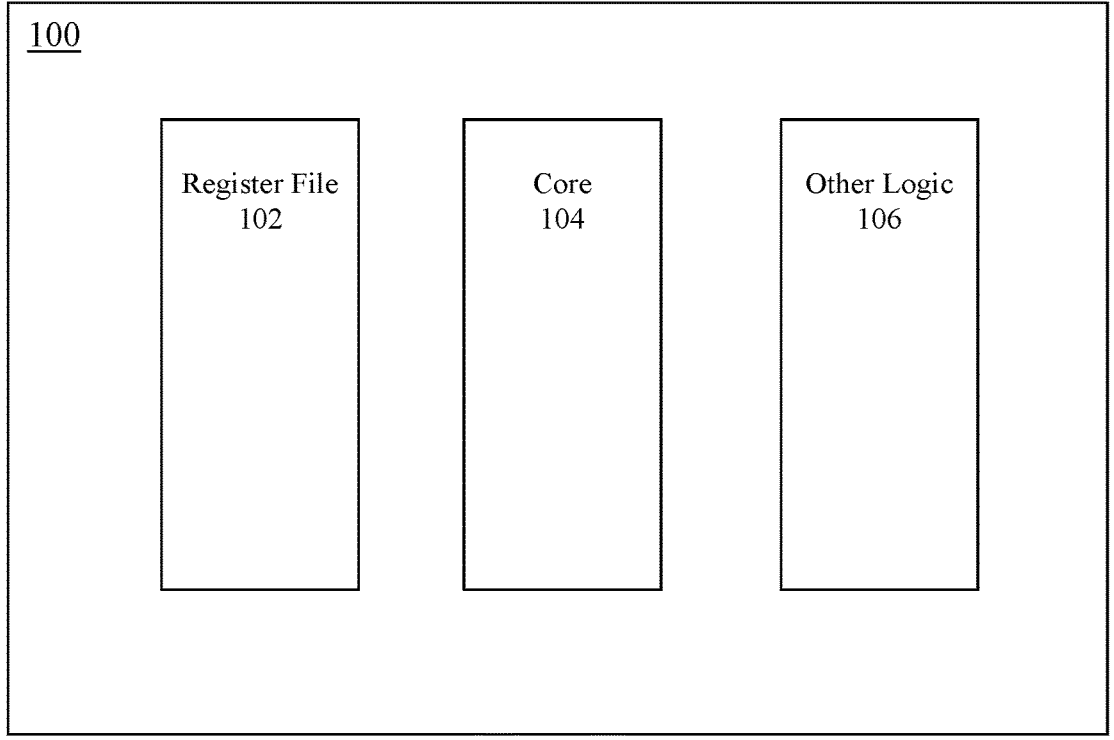
FIG. 1 is a block diagram of an example integrated circuit having a configurable register file according to embodiments of the invention.

In connection with these and other general aspects, FIG. 1 is a block diagram illustrating an example integrated circuit (IC) 100 according to embodiments of the invention. As shown, IC 100 includes register file 102, core logic 104 and other logic 106.

In embodiments, IC 100 is implemented using the metal configurable standard cell (MCSC) technology described in U.S. Pat. No. 8,533,641, the contents of which are incorporated herein by reference in their entirety. However, the principles of the invention can be extended to other integrated circuit technologies such as FPGA, conventional or full custom ASIC, etc. Moreover, it should be noted that the invention can include integrated circuits that have been designed for one platform such as structured ASIC or FPGA and then ported or converted to a different platform such as MCSC using conventional ASIC electronic design automation (EDA) tools that have been adapted and/or supplemented for performing metal configurable routing for MCSC platforms.

Register file 102 is a metal configurable register file according to embodiments of the invention that will be described in more detail below. It should be noted, however, that only a single register file 102 is shown purely for ease of illustration. In embodiments, IC 100 can include several register files, including several metal configurable register files to be described in more detail below. It should be further noted that IC 100 can include various other types of register files and memories such as random access memory (RAM), read-only memory (ROM), etc., including one or more metal configurable memories such as those described in co-pending U.S. application Ser. No. 15/181,007, the contents of which are incorporated by reference herein in their entirety.

Core logic 104 typically comprises a multiplicity of functional circuit blocks or IPs and can include microprocessors, microcontrollers, state machines and other processing units, as well as other types of logic.

Other logic 106 includes lower-level logic input/output (IO) circuitry, PHY (e.g. DDR/LVDS PHY), PLLs, transceivers, etc. In an example where IC 100 is based on MCSC technology, some or all of such other logic 106 can be implemented using techniques described in U.S. Patent Publ. No. 2014/0247525, the contents of which are incorporated by reference herein in their entirety.

Figure 2A:
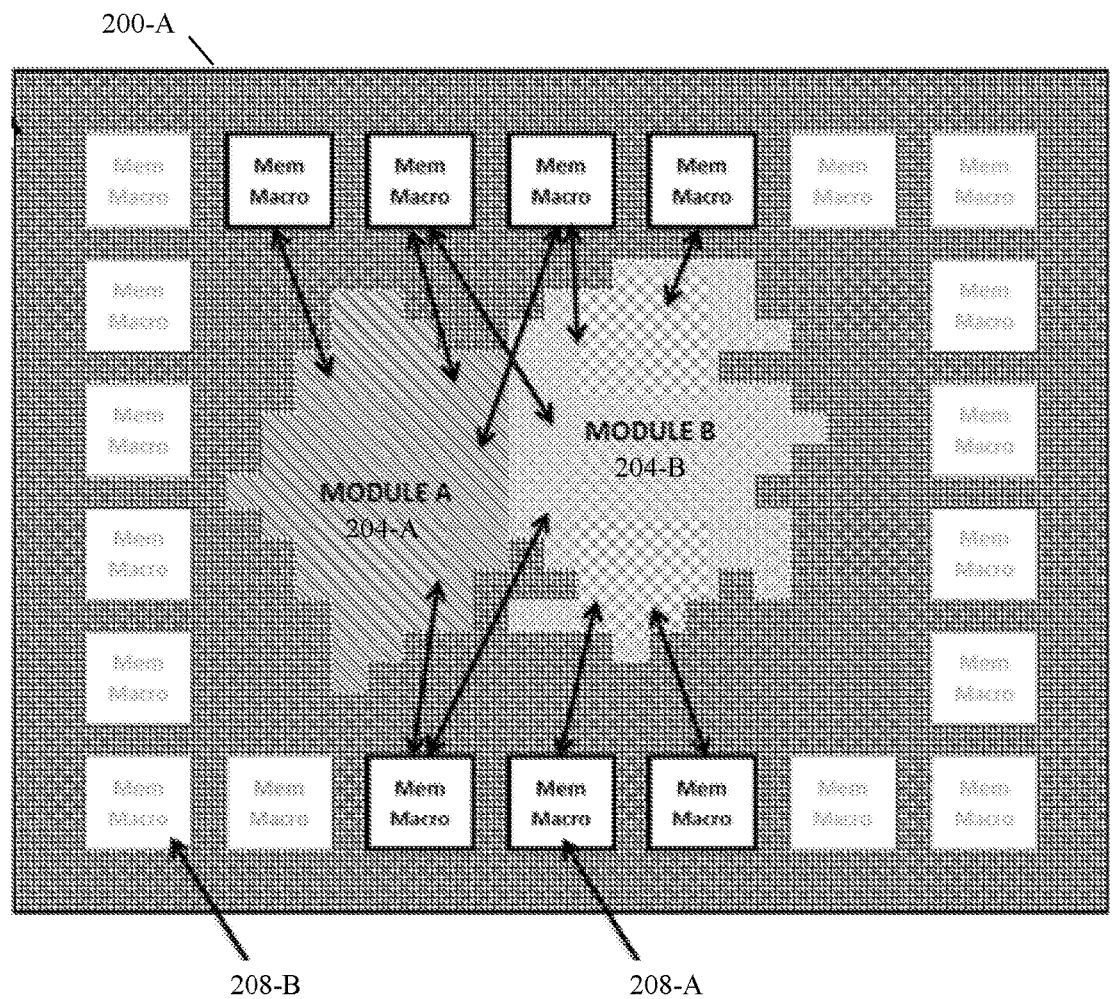
FIGS. 2A and 2B are block diagrams illustrating example aspects of a metal configurable register file according to embodiments of the invention in comparison to conventional hard memory macros.
Figure 2B:
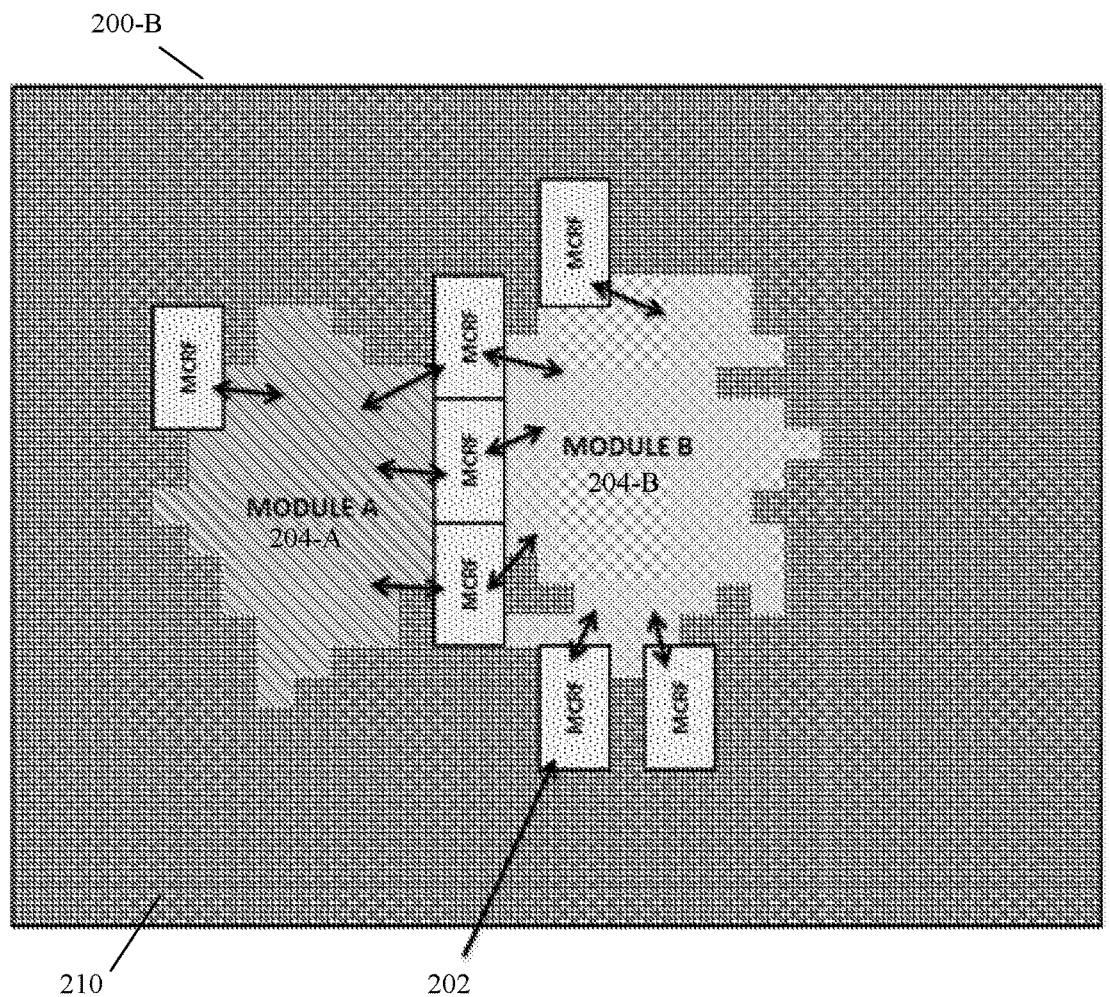

FIGS. 2A and 2B illustrate aspects of embodiments of the invention in contrast to conventional implementations.

FIG. 2A is a block diagram illustrating an example IC 200-A that can be implemented similarly to IC 100 described above in FIG. 1 but with only hard macro memory and without the benefit of metal configurable technology according to the present embodiments. As shown, IC 200-A includes functional modules 204-A and 204-B, which can be comprised of core logic such as that described above in connection with FIG. 1. In this example, memories 208-A have been configured to support and communicate with modules 204-A and 204-B.

As set forth above, one conventional way to implement memories 208-A in an IC such as IC 200-A is using hard memory macros. The hard memory macro is pre-built with a certain memory size (e.g. 10 Kb) per memory 208-A. Thus, if modules 204-A and/or 204-B only need a small memory (e.g. 1 Kb), using a 10 Kb hard memory macro is neither area nor power efficient. Moreover, as shown in FIG. 2A, the hard memory macros are placed in predetermined locations such as along the periphery of IC 200-A. This can lead to inefficiencies in routing communications between memories 208-A and modules 204-A and 204-B. Still further, as shown in FIG. 2A, the logic and area comprising unused memories 208-B that are pre-built in the hard memory macro cannot be re-used for other purposes. In other words, if a given design does not require all of the pre-built memory blocks of the hard memory macro, the unused blocks 208-B are wasted.

FIG. 2B is a block diagram illustrating an example IC 200-B that also can be implemented similarly to IC 100 described above in FIG. 1. As shown, IC 200-B also includes functional modules 204-A and 204-B, which can be comprised of core logic such as that described above in connection with FIG. 1. In this example, as contrasted with IC 200-A, register files 202 have been configured in place of hard memory macro 208-A and to support and communicate with modules 204-A and 204-B. In embodiments, register files 202 are implemented using MCSC base cells 210, as is the rest of the logic in IC 200-B. Accordingly, logic resources are not wasted depending on the number of register files 202 that are needed, or if their size is less than a predefined size as in the conventional example of FIG. 2A. Moreover, as illustrated in FIG. 2B, because register files 202 are implemented using MCSC base cells 210, they are not restricted to being placed in certain locations as in the hard memory macro. Still further, for a new design that does not require memories, the area of register files 202 in IC 200-B could be used for any logic function other than memory.

Figures 3A, 3B:
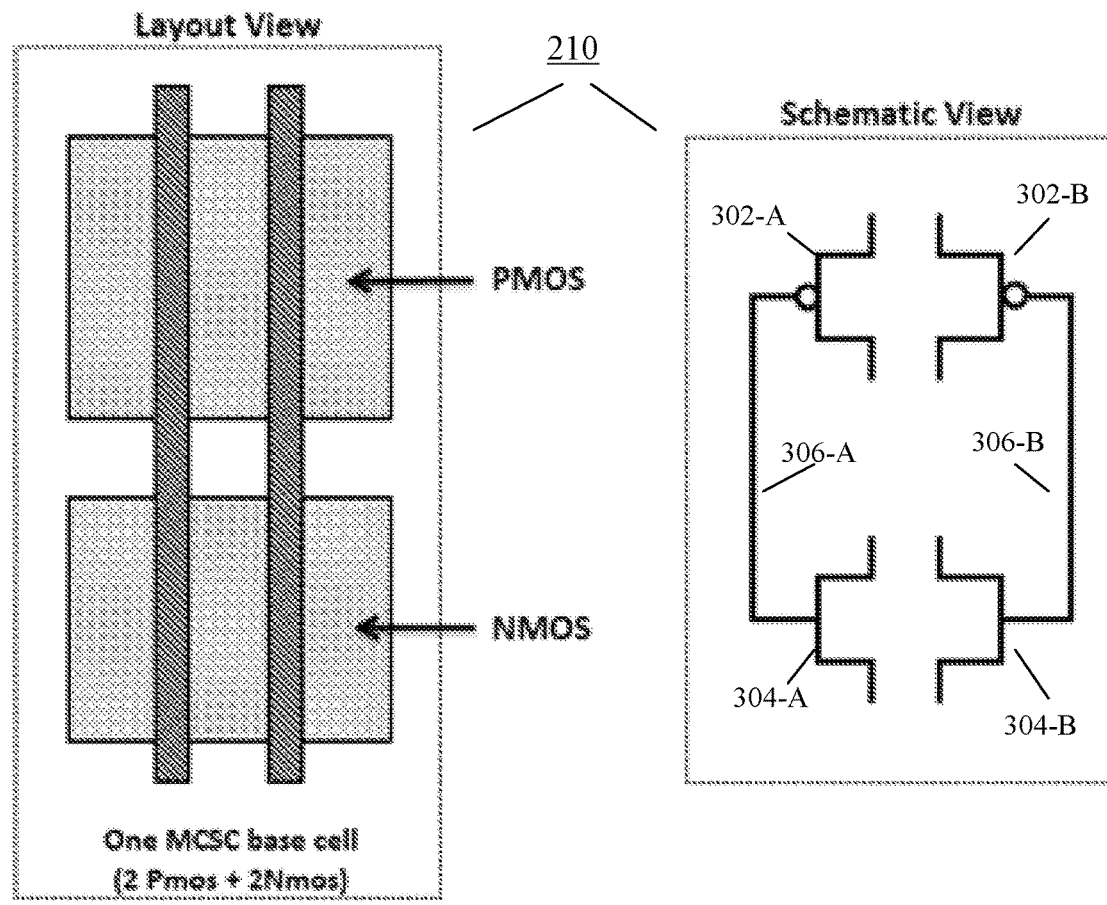
FIGS. 3A and 3B are views of an example base cell that can be used to implement a metal configurable register file according to embodiments of the invention.

As shown in FIG. 2B, the MCSC base cells 210 that are used to implement all of the logic of IC 200-B each have a uniform size and are laid out in a fixed pattern. FIGS. 3A and 3B are a layout view and schematic view, respectively, that show the structure of an example single MCSC base cell 210. As shown, base cell 210 includes two PMOS transistors 302-A and B and two NMOS transistors 304-A and B formed in underlying transistor layers (e.g., underlying substrate, diffusion, gate electrode layers), with transistor pairs having their gates connected by gate lines 306-A and B using "fixed" metal layer regions. As set forth previously, individual ones of cell 210 can be further connected together to form metal configurable standard cells (e.g. NAND gates, buffers, muxes, flip-flops, etc.) using "programmable" metal layer regions as described in more detail in U.S. Pat. No. 8,533,641, the contents of which are incorporated by reference herein. These standard cells can be further connected together to form any desired user logic, including the register files according to the present embodiments, through conventional ASIC design implementation flow such as synthesis, place and route.

Returning to FIG. 2B, according to additional aspects, register files 202 are implemented as a soft macro-cell (i.e. soft macro) that can be selected for a design and configured in a conventional design flow, for example from a cell library.

As will be appreciated by those skilled in the art, there are several distinctions between hard and soft macros in a structured ASIC design. For example, once they are selected to be included in a given design, the logic associated with hard macros is not configurable to include more or less of a certain set of predefined features or to consume fewer logic resources. Moreover, the logic associated with hard macros is typically restricted to be placed in certain physical locations because typically the transistors that compose the hard macros may not have same size or layout as the metal configurable base cell of FIGS. 3A and 3B. In contrast, a metal configurable register file 202 according to embodiments consist of metal configurable base cells for the logic associated with a soft macro and can be configured via certain variable parameters, such as width and depth, or the inclusion of certain logic features by customizing only the programmable metal layers. Moreover, the logic associated with soft macros is typically allowed to be placed in physical locations that are determined to be accessible or advantageous by a placement tool, for example, as they do not require predetermined location as do hard memory macro 208-A or 208-B as shown in FIG. 2A.

Those skilled in the art will understand how to implement these and other macro embodiments of the invention after being taught by the present disclosure. It should be noted, however, that the invention is not limited to being implemented using macro-cell techniques, but can be extended to other types of design methodologies.

As an example of soft macro embodiments of the invention, register files 202 may be implemented with depths of 8 or 16 and widths from 1 to 40 being configuration options by only changing the metal layers. Other depth and width configuration options are possible in other embodiments, and those skilled in the art will be able to understand how to implement these variations after being taught by the present examples.

FIGS. 4A and 4B are top-level block diagrams illustrating example register files according to these and other embodiments of the invention.

As shown in this example, register file 402-A has a minimum width of one (1) and register file 402-B has a maximum width of forty (40). Both register files include an input/output (JO) slice 422 for each configured word (i.e. one to 40) and a single control slice 424. In the example shown in FIGS. 4A and 4B, register files 402-A and 402-B have external signals communicated with associated input/output pins described in TABLE 1 below.

TABLE 1

| Pin | Description |
| --- | --- |
| DIN[0 . . . 39] | Data Input |
| BITEN[0 . . . 39] | Bit Enable (for configurations supporting a bit-enable feature) |

TABLE 1-continued

| Pin | Description |
| --- | --- |
| RE | Read Enable |
| WE | Write Enable |
| RCK | Read Clock |
| WCK | Write Clock |
| RADD[0 . . . 2/3] | Read Address (2 for ×8 depth, 3 for ×16 depth) |
| WADD[0 . . . 2/3] | Write Address (2 for ×8 depth, 3 for ×16 depth) |
| T_SEL | Margin control pin |

Those skilled in the art of integrated circuit register files and memories will understand how external logic can use these well-understood signals to communicate with and operate the associated register file 402. As such, further details thereof will be omitted here for sake of clarity of the invention.

Figure 5:
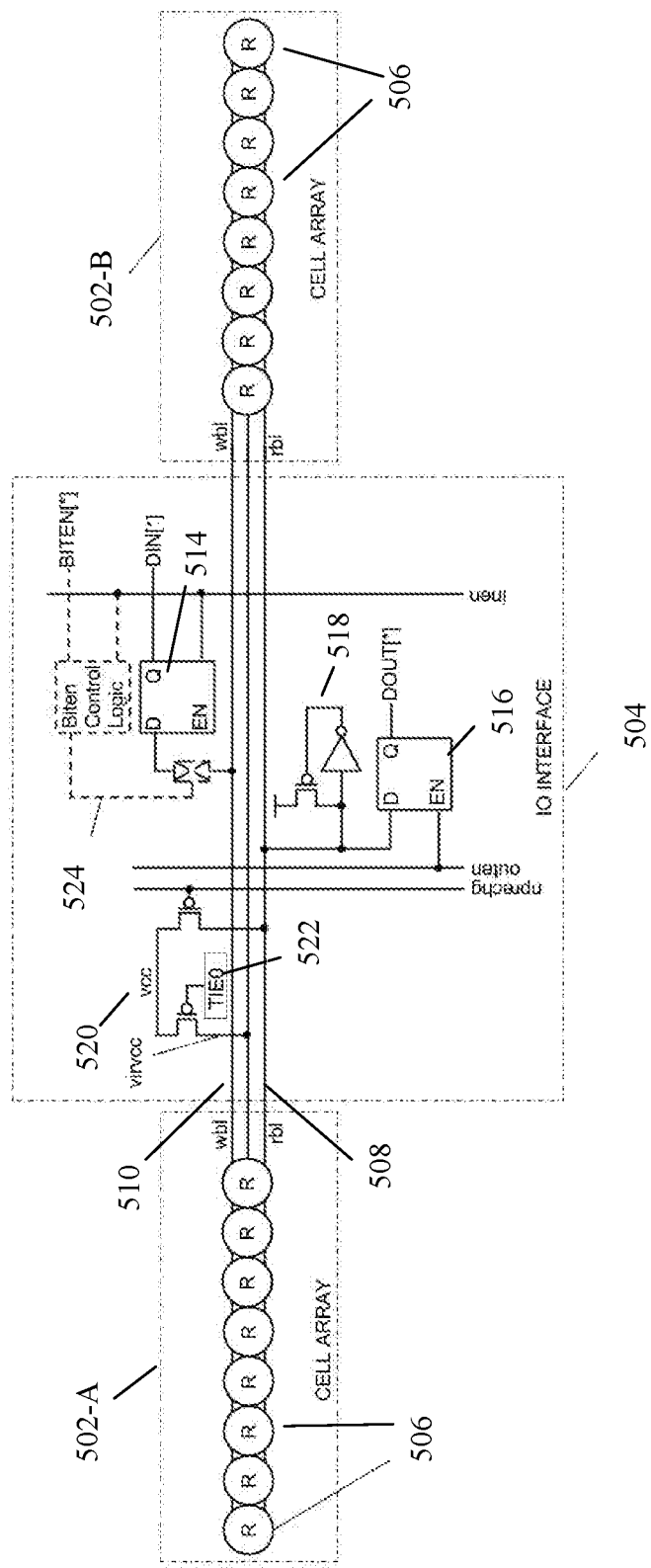
FIG. 5 is a schematic diagram of an example implementation of a configurable register file IO slice according to embodiments of the invention.

FIG. 5 is a schematic diagram illustrating an example implementation of IO slice 422 according to embodiments.

As shown, IO slice 422 in this example includes one or two 8-bit cell arrays 502-A and 502-B, depending on the soft macro configured depth of an associated register file. For example, if the associated register file is configured to have an 8-bit depth, only array 502-A is included in IO slice 422. If the associated register file is configured to have a 16-bit depth, IO slice 422 includes both array 502-A and 502-B. In either event, IO slice 422 in this example further includes IO interface block 504.

As further shown in this example, each cell array 502 comprises eight memory bit cells 506 commonly coupled to read and write bit lines 508 and 510, respectively. As described in more detail below, in embodiments, bit cells 506 can be configured as register file single port, dual port bit cells or ROM bit cells.

As further shown in this example, interface block 504 includes a write driver with input register/latch 514, output latch 516, domino keeper 518, bit-line pre-charge circuitry 520 and virtual power generator 522. For configurations including bit enable support, interface block 504 further includes bit enable control logic 524. According to certain aspects, this logic can be excluded from block 504 and the associated register file by configuration of the soft macro depending on user preference.

Those skilled in the art will be able to understand how to implement a soft macro for generating the example circuitry shown in block 504 using MCSC base cells such as those shown in FIG. 3 and MCSC configuration technology such as that described in U.S. Pat. No. 8,533,641 after being taught by the present examples.

Figures 6A, 6B:
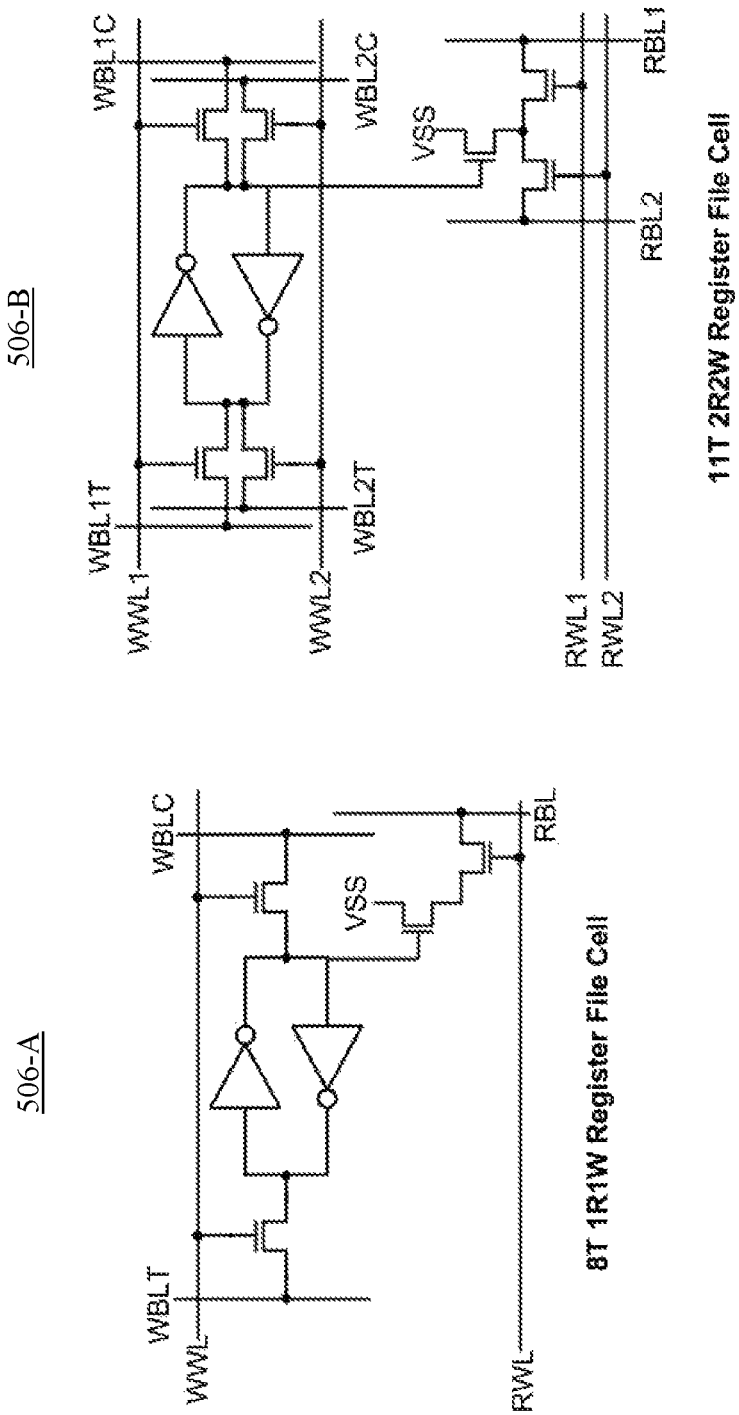
FIGS. 6A and 6B are schematic diagrams illustrating example variants of register file bit cells in a configurable register file according to embodiments of the invention.

FIGS. 6A and 6B are schematic diagrams of two example implementations of a register file bit cell 506 according to embodiments.

More particularly, according to certain aspects, embodiments of the invention shown in FIGS. 6A and 6B include two main variants of a register file bit cell 506 in which the variant shown in FIG. 6A includes one read port and one write port and the variant shown in FIG. 6B includes two read ports and two write ports. It should be noted that the invention is not limited to these variants and that the principles of the invention can be applied to any other multi-port memory implementation.

To illustrate how MCSC base cells and programmable metal layers can be used to implement register file bit cells according to embodiments, in the variant shown in FIG. 6A, single port register file bit cell 506-A is implemented using eight transistors from three MCSC base cells which are coupled to a single read bit line 508 (RBL) and a single write bit line 510 (WBLT/WBLC). Meanwhile as shown in FIG. 6B, dual port register file bit cell 506-B is implemented using transistors from five MCSC base cells which are coupled to two read bit lines 508 (RBL1 and RBL2) and two write bit lines 510 (WBLT1/WBLC1 and WBLT2/WBLC2).

Those skilled in the art will be able to understand how to implement a soft macro for generating the example circuitry shown in FIGS. 6A and 6B using MCSC base cells such as those shown in FIG. 3 and MCSC configuration technology such as that described in U.S. Pat. No. 8,533,641 after being taught by the present examples.

It should be further noted that although the present disclosure focuses on preferred register file implementations, this is not intended to be limiting. For example, those skilled in the art will appreciate that the principles of the invention can be extended to single port memories by connecting up both the read and write port address lines together. Both read and write port clocks would also need to come from the same source to avoid racing conditions. True dual-port memories can be supported using 2R2W register file bit cells such as 506-B. Still further, the illustrated register file bit cells according to the present embodiments can be extended to a FIFO or shift register with some external logic block added into it.

As set forth above, embodiments of the invention can include ROM bit cells instead of register file bit cells implementing the bit cells 506 in cell arrays 502 shown in the example IO slice 422 of FIG. 5.

For example, FIGS. 7A and 7B are schematic diagrams illustrating an example of how a single MCSC base cell can be configured to implement a single ROM bit cell for storing a single bit of data. More particularly, MCSC base cell 702 in FIG. 7A has been configured to store a "0" bit by coupling the gate of NMOS transistor 704-B to the REN signal line, the source of NMOS transistor 704-B to the Q signal line, and by leaving transistors 704-A, 704-C and 704-D floating an unused.

Meanwhile, MCSC base cell 702 in FIG. 7B has been configured to store a "1" bit by coupling the gates of transistors 704-A and 704-B to the REN signal line, connecting PMOS transistors 704-A and 704-C to power, coupling the gate of PMOS transistor 704-C to the source of NMOS transistor 704-B, coupling the source of PMOS transistor 704-C to the Q signal line and by leaving transistor 704-D floating and unused.

As another example, FIGS. 8A to 8D are schematic diagrams illustrating an example of how a single MCSC base cell can be configured to implement two ROM bit cells for storing two bits of data. More particularly, MCSC base cell 802 in FIG. 8A has been configured to store two "0" bits of data. In this example, this is done by coupling the gate of NMOS transistor 804-B to the REN1 signal line, coupling the gate of NMOS transistor 804-D to the REN2 signal line, coupling the sources of NMOS transistors 804-B and 804-D to the Q1 and Q2 signal lines, respectively, and leaving transistors 804-A and 804-C floating or unused.

Figures 8A, 8B:
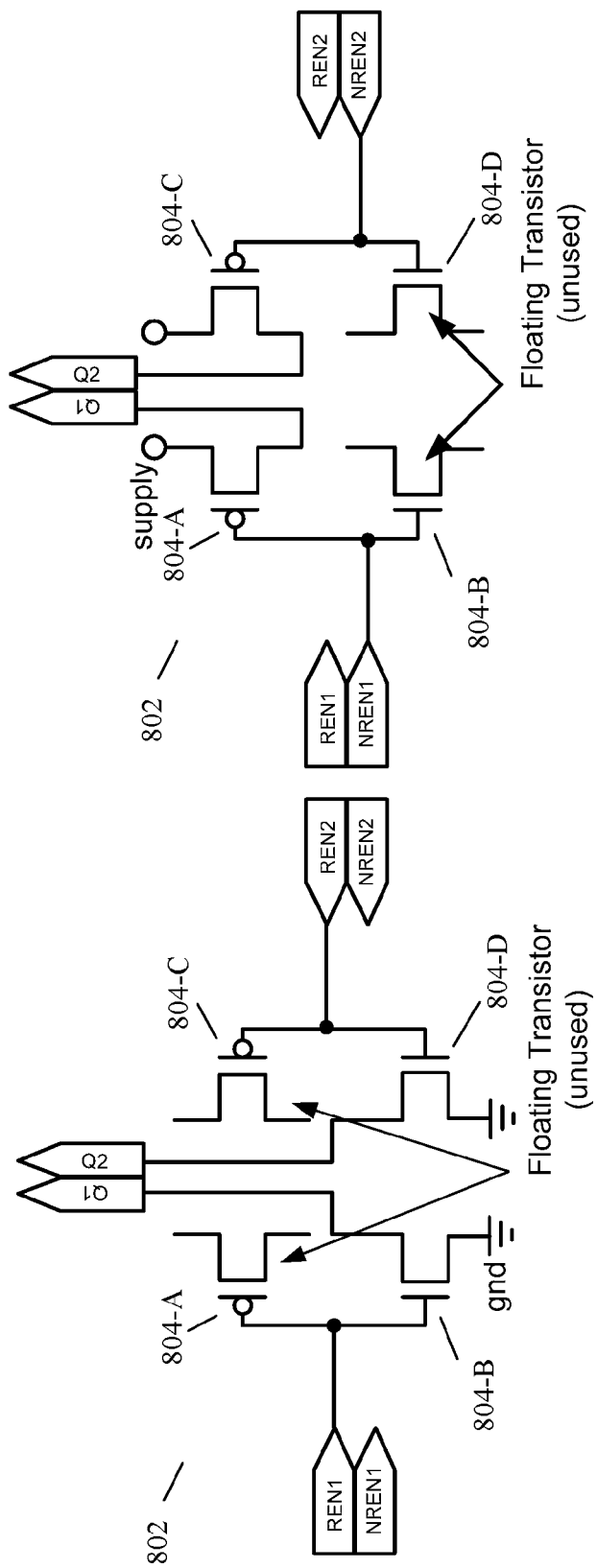
FIGS. 8A to 8D are schematic diagrams illustrating example implementations of ROM bit cells for storing two bits of data in a configurable register file according to embodiments of the invention.

FIG. 8B illustrates an example of how MCSC base cell 802 can be configured to store two "1" bits of data. In this example, this is done by coupling the gate of PMOS transistor 804-A to the NREN1 signal line, coupling the gate of PMOS transistor 804-C to the NREN2 signal line, coupling the sources of PMOS transistors 804-A and 804-C to power, coupling the drains of PMOS transistors 804-A and 804-C to the Q1 and Q2 signal lines, respectively, and leaving transistors 804-B and 804-D floating or unused.

Figures 8C, 8D:
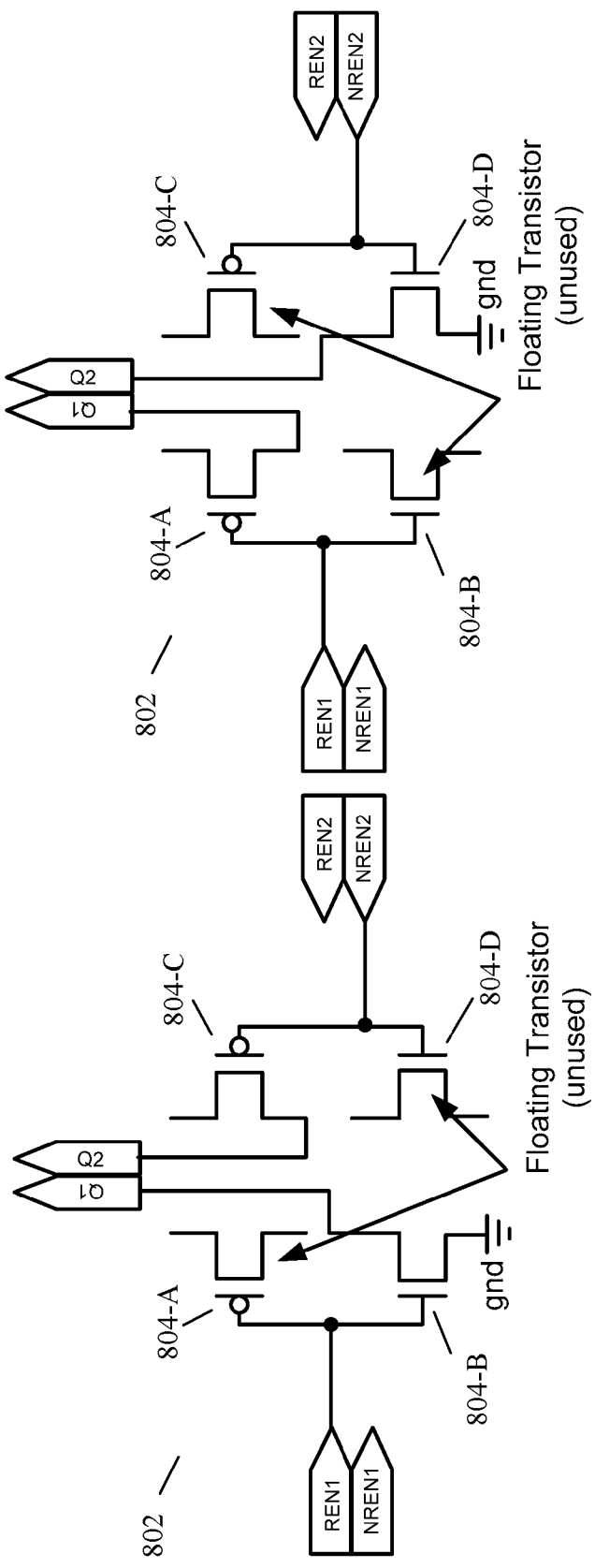

FIG. 8C illustrates an example of how MCSC base cell 802 can be configured to store two bits of data representing the value of "01". In this example, this is done by coupling the gate of NMOS transistor 804-B to the REN1 signal line, coupling the gate of PMOS transistor 804-C to the NREN2 signal line, coupling the sources of transistors 804-B and 804-C to the Q1 and Q2 signal lines, respectively, and leaving transistors 804-A and 804-D floating or unused.

FIG. 8D illustrates an example of how MCSC base cell 802 can be configured to store two bits of data representing the value of "10". In this example, this is done by coupling the gate of PMOS transistor 804-A to the REN1 signal line, coupling the gate of NMOS transistor 804-D to the NREN2 signal line, coupling the sources of transistors 804-A and 804-D to the Q1 and Q2 signal lines, respectively, and leaving transistors 804-B and 804-C floating or unused.

It should be noted that in register files using ROM bit cells according to the present embodiments, some of the IO slice circuitry in IO interface block 504 shown in FIG. 5 can be removed to further optimize the area/power (e.g. write driver, input register/latch and virtual power generator). In any event, those skilled in the art will be able to understand how to implement a soft macro for generating the example ROM bit cell circuitry shown in FIGS. 7 and 8 using MCSC base cells such as those shown in FIG. 3 and MCSC configuration technology such as that described in U.S. Pat. No. 8,533,641 after being taught by the present examples.

Figure 9:
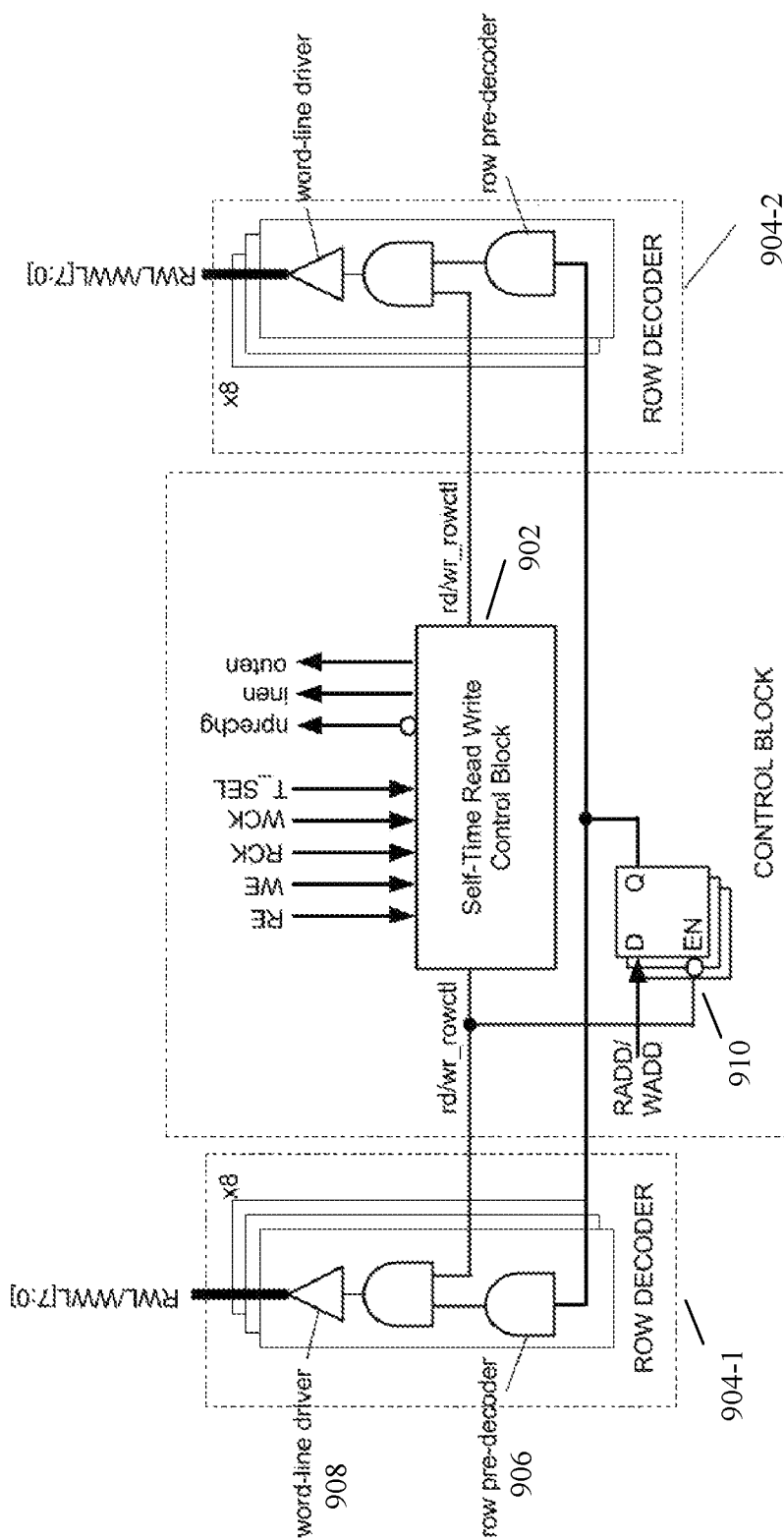
FIG. 9 is a schematic diagram of an example implementation of a configurable register file control slice according to embodiments of the invention.

FIG. 9 is a schematic diagram illustrating an example implementation of control slice 424 according to embodiments.

As shown, the control slice of a register file according to embodiments includes a self-time read and write control block 902, and a row decoder 904 having a row address decoder 906 and row driver 908, and address and enable register/latch 910. There is also a timer select pin "T_SEL" to improve the register file robustness by trading off its performance. More particularly, when T_SEL=0, register file performance is improved, while when T_SEL=1, register file robustness is improved by providing more delay/timing margin for internal circuitry.

As shown in the example of FIG. 9, row decoder 904 includes a row address decoder 906 and row driver 908 for each cell of eight bits of cells in array 502. Accordingly, in configurations having two arrays 502-A and 502-B, there are two associated row decoders 904-1 and 904-2.

In embodiments, a register file having a control slice 424 such as that shown in FIG. 9 is a fully synchronous memory and its read/write operation may be similar to most of the industry memory IP. Read and write operations requested by external logic are triggered by the rising clock cycle of "RCK" or "WCK" with "RE" or "WE" asserted, respectively. In response, control block 902 will trigger the "rd/wr_rowctl" signal shown in FIG. 9 and cause row decoder 904 to fire the RWL/WWL pulse to read/write data from/to the addressed bit-cell.

Those skilled in the art will be able to understand how to implement a soft macro for generating the example IO control slice circuitry shown in FIG. 9 using MCSC base cells such as those shown in FIG. 3 and MCSC configuration technology such as that described in U.S. Pat. No. 8,533,641 after being taught by the present examples.

As set forth above, because the register files of the present embodiments are implemented using a custom soft macro, they can be laid out in a way that maximizes sharing of routing resources in the macro. In this regard, the present inventors have recognized that bit-line routing and word-line routing are among the highest routing resources used in a memory array. Accordingly, sharing the bit-line and word-line routing resources across multiple bit-cells can help reduce the routing resource usage. These and other aspects are illustrated in FIGS. 10A and 10B.

More particularly, FIG. 10A is a block diagram of an example RTL memory bit array. As shown, because RTL bit cells 1002 are typically implemented using latches, each must have their own independent read bit line 1004 coupled to a multiplexer 1006. This requires corresponding logic resources and routing resources.

FIG. 10B is a block diagram illustrating an example cell array for a register file according to embodiments of the invention, for example a cell array 502 such as that shown in FIG. 5. As shown, with custom logic bit cells 506, it is possible to have a shared read bit line 510, those improving upon the routing and logic usage issues of RTL based memory as shown in FIG. 10A.

Figure 11:
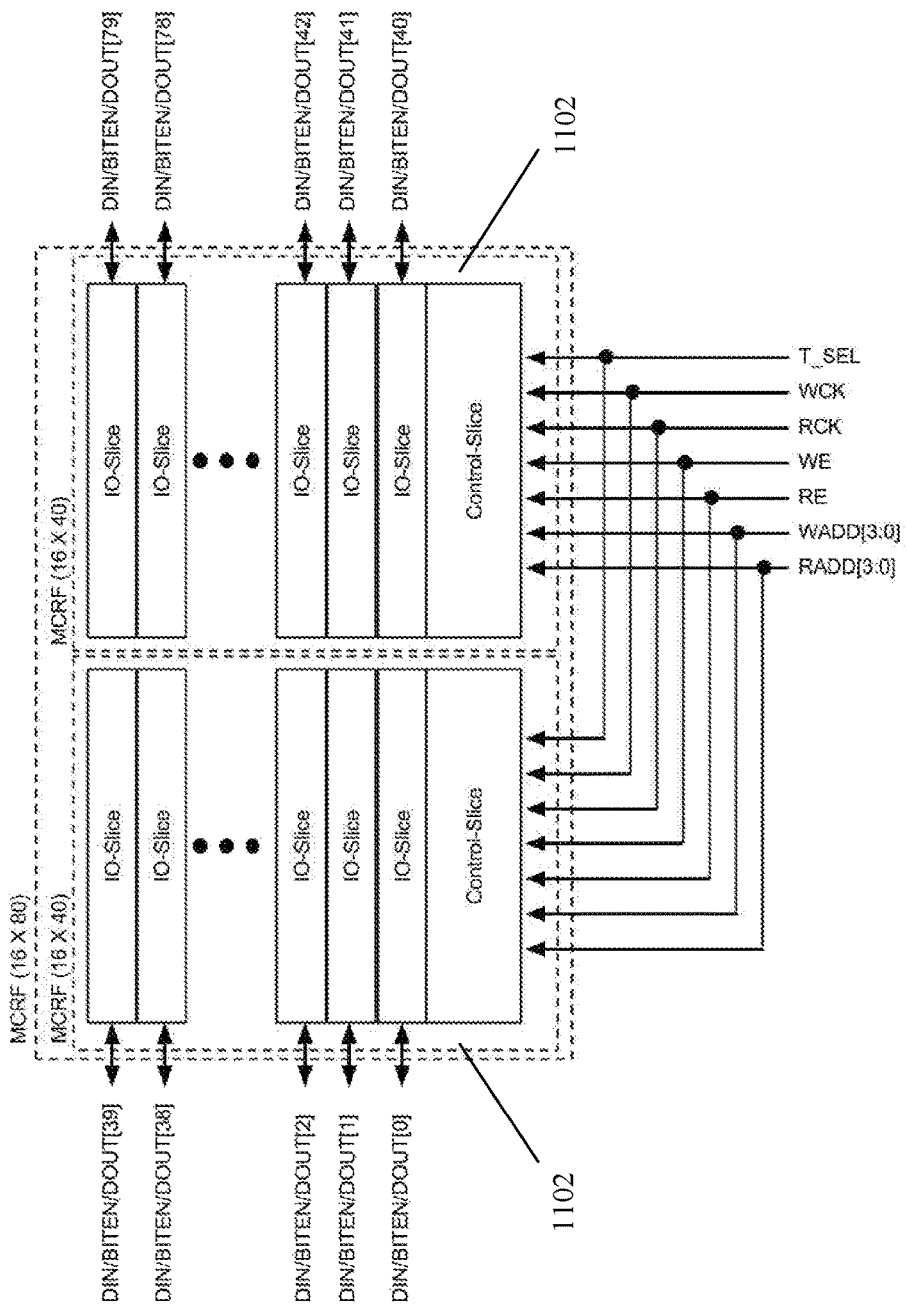
FIG. 11 is a block diagram illustrating an example for extending a macro according to embodiments beyond×40 width (e.g. 16×80)
Figure 12:
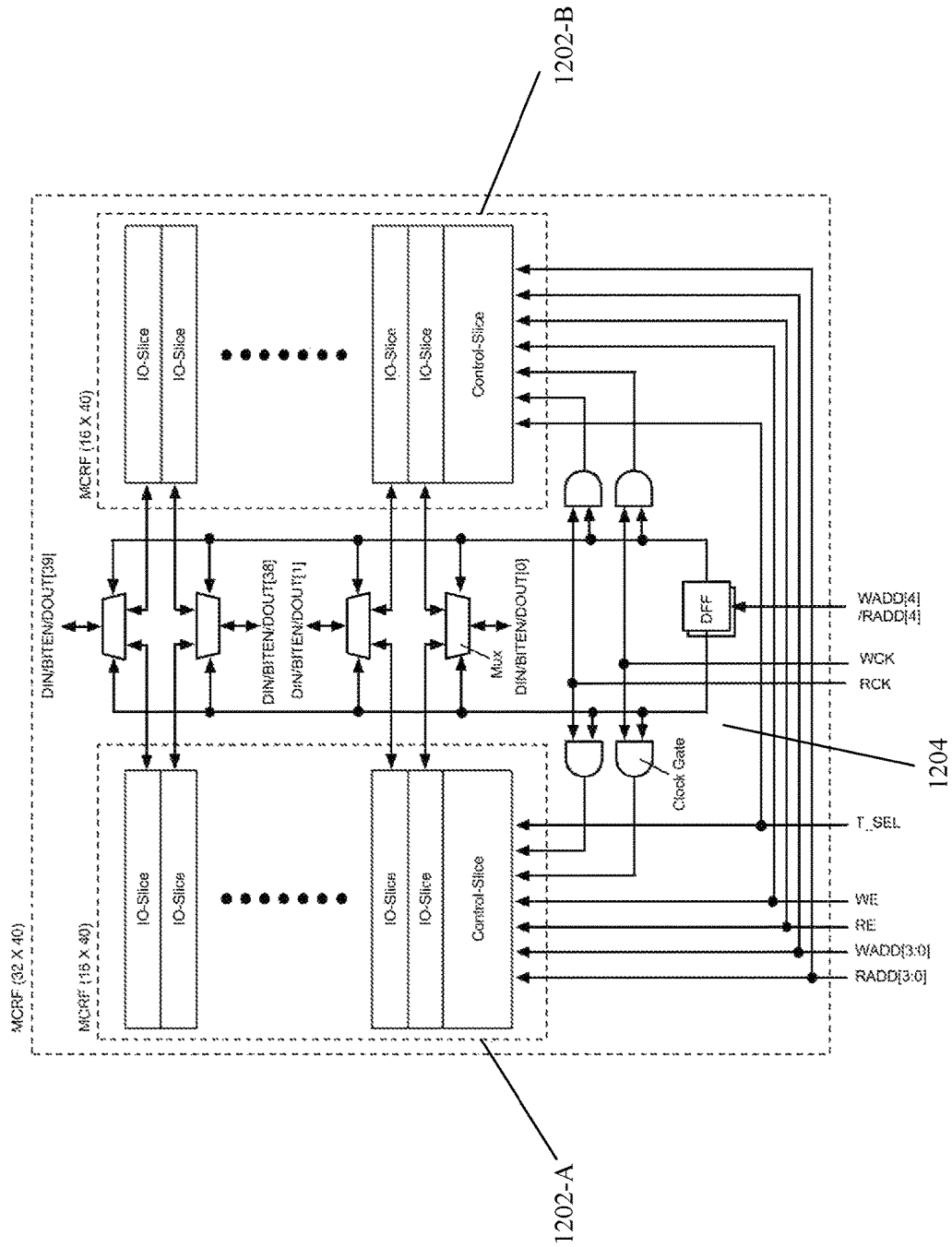
FIG. 12 is a block diagram illustrating an example for extending a macro according to embodiments beyond×16 depth (e.g. 32×40)

It should be noted that a metal configurable register file according to embodiments such as that shown in FIGS. 4A and 4B can be cascaded or combined to form a bigger memory macro beyond the ×16 depth or ×40 width described in connection therewith above. For example, this can be done by cascading/abutting IO/control-slice 424 to arrive at the desired depth or width. FIG. 11 is a block diagram illustrating an example for extending the macro beyond×40 width (e.g. 16×80). As shown in FIG. 11, this can be achieving by cascading two 16×40 metal configurable register files 1102 side by side. FIG. 12 is a block diagram illustrating an example for extending the macro beyond×16 depth (e.g. 32×40). As shown in FIG. 12, this can be done by combining two 16×40 metal configurable register files 1202-A and 1202-B with some extra glue logic 1204 (e.g. muxes, clock gates and D-Flipflops). The additional MSB write and read address (WADD/RADD[4]) is used to turn on either a lower ROW (address from 0 to 15, register file 1202-A) or upper ROW (address from 16 to 31, register file 1202-B) through the MUX and clock gate control.

Relatedly, according to still further aspects, a metal configurable register file according to the present embodiments can be cascaded or combined with a hard memory macro to further improve the memory area efficiency of larger memory blocks using hard memory macros. According to these and other aspects, embodiments of cascading and combining a few different types of soft macro register files reduces design efforts as compared to creating many different types and sizes of hard register file macros.

Figure 13B:
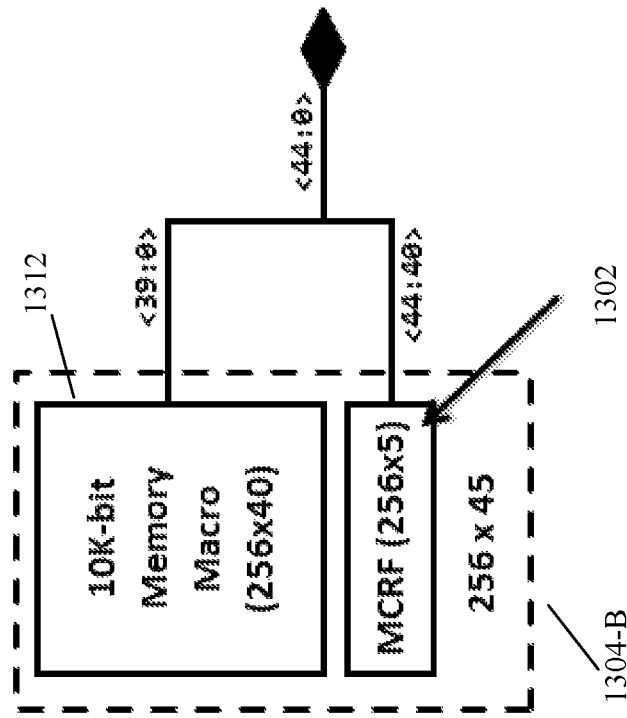
FIGS. 13A and 13B are block diagrams illustrating example aspects of forming memories using both hard and soft macros according to embodiments of the invention.
Figure 13A:
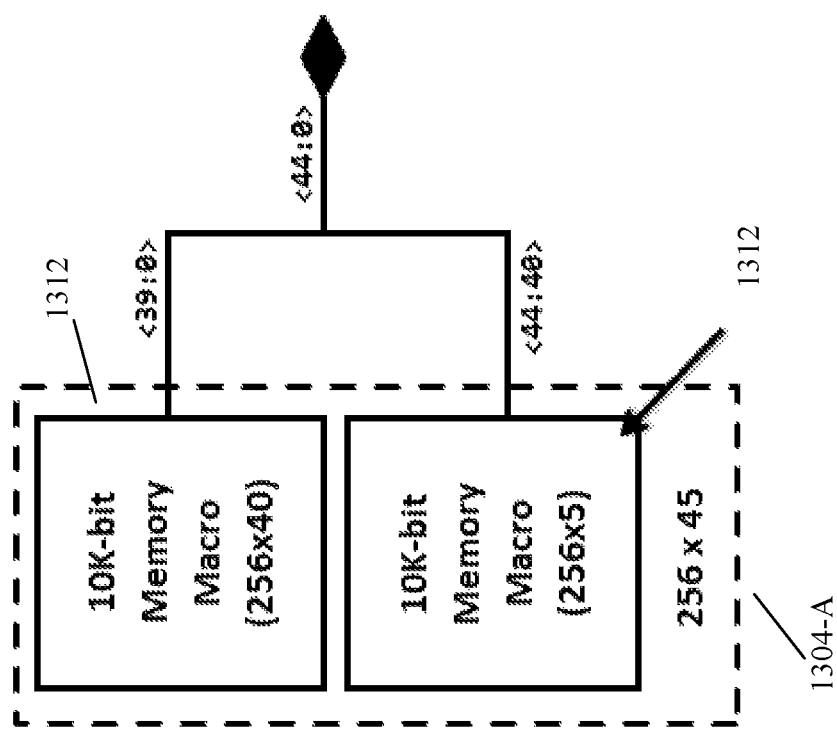

For example, FIG. 13A is a block diagram illustrating how a 256×45 memory 1304-A would typically be implemented using two 10 k-bit hard memory macros 1312, with one configured as 256 depth×40 width and the other one configured as 256 depth×5 width. Because one of the hard memory macros 1312 is configured as 256 depth×5 width, only 1,280 bits out of total resource of 10,240 bits (12.5%) are being used. This causes low resource utilization on this memory and the unused memory resource cannot be used by other memory blocks and it is a wasted area.

Meanwhile, FIG. 13B is a block diagram illustrating how a 256×45 memory 1304-B can be implemented using a 10 k-bit hard memory macro 1312 configured as a 256×40 memory combined with a metal configurable memory soft memory macro 1302 configured as a 256×5 memory. As shown, there would be no wasted logic resources, and the resulting combination would allow memory 1304-B to consume much less area than memory 1304-A.

Figure 14:
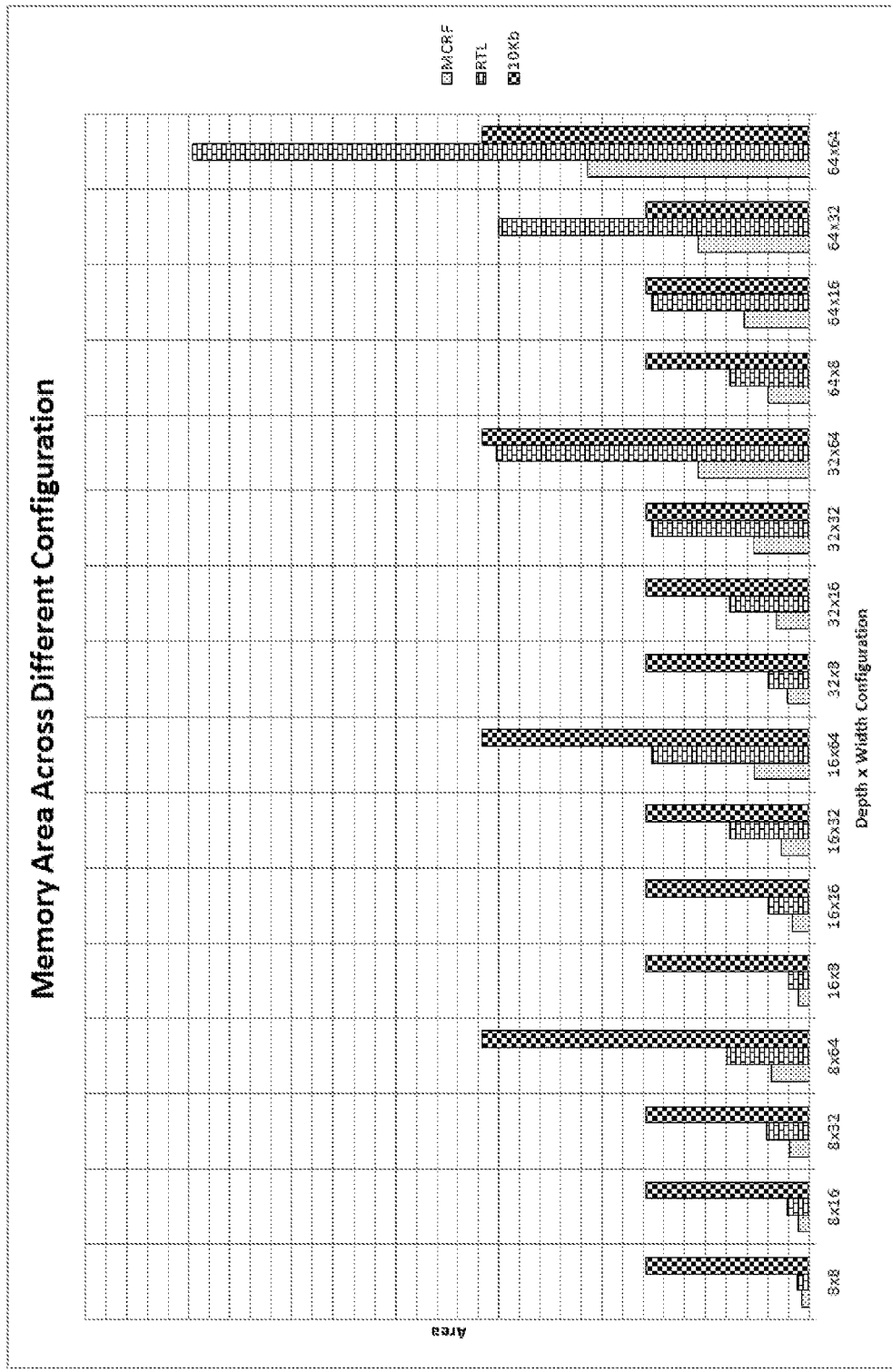
FIGS. 14 and 15 are charts illustrating aspects of area and power advantages provided by embodiments of the invention.
Figure 15:
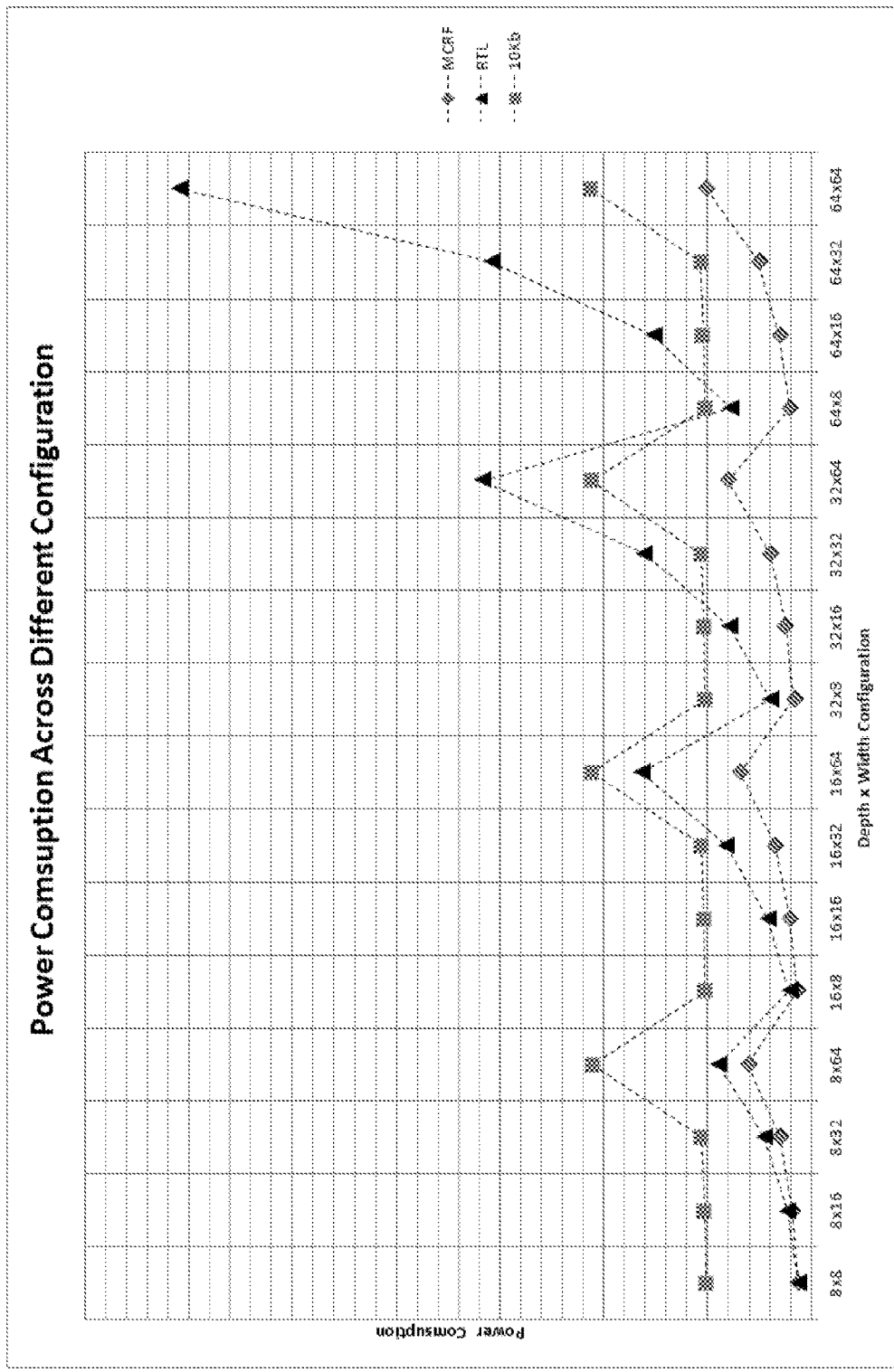

FIGS. 14 and 15 are graphs illustrating the area and power comparison results, respectively, between hard memory macro (10 Kb), RTL-based memory and a metal configurable register file according to embodiments. These results show that the register files of the present embodiments are the most area and power efficient solution across different memory depth and width configurations.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. An integrated circuit, comprising:
a register file having a plurality of bit cells for storing and retrieving data, the register file being comprised by:
a plurality of base cells arranged in a fixed pattern and each having a fixed transistor size; and
a plurality of interconnections, wherein the plurality of base cells are interconnected together using the interconnections in programmable metal layers to thereby form the register file and the plurality of bit cells.

2. The integrated circuit according to claim 1, wherein the base cells comprise metal configurable standard cells (MCSC).

3. The integrated circuit according to claim 1, the base cells are configurable using the programmable metal layers to thereby change a width of the register file.

4. The integrated circuit according to claim 1, the base cells are configurable using the programmable metal layers to thereby change a depth of the register file.

5. The integrated circuit according to claim 1, the base cells are configurable using the programmable metal layers to thereby change a memory cell type of the bit cells comprising the register file.

6. The integrated circuit according to claim 5, wherein the memory cell type comprises single port bit cells.

7. The integrated circuit according to claim 5, wherein the memory cell type comprises dual port bit cells.

8. The integrated circuit according to claim 5, wherein the memory cell type comprises ROM bit cells.

9. The integrated circuit according to claim 5, wherein the memory cell type comprises multi-port bit cells.

10. The integrated circuit according to claim 1, wherein the register file is implemented using a soft macro in an integrated circuit design flow.

11. The integrated circuit according to claim 1, wherein the register file is implemented using two or more soft macros in an integrated circuit design flow, wherein the two or more soft macros are combined together to obtain a register file having a desired width and depth.

12. The integrated circuit according to claim 11, wherein the desired width and depth is different than a width and depth of the individual two or more soft macros.

13. The integrated circuit according to claim 1, wherein the register file is implemented using both one or more soft macros and one or more hard macros in an integrated circuit design flow.

14. A method of implementing an integrated circuit, comprising:
implementing a register file so as to include a plurality of bit cells for storing and retrieving data, the implementing of the register file including using a plurality of base cells arranged in a fixed pattern and each having a fixed transistor size; and specifying interconnections among the plurality of base cells using programmable metal layers to thereby form the register file and the plurality of bit cells.

15. The method according to claim 14, wherein one or both of implementing and specifying are performed in a preconfigured way to form the register file having a desired width.

16. The method according to claim 14, wherein one or both of implementing and specifying are performed in a preconfigured way to form the register file having a desired depth.

17. The method according to claim 14, wherein one or both of implementing and specifying are performed so as to form the register file having a preconfigured memory cell type of the bit cells comprising the register file.

18. The method according to claim 17, wherein the desired memory cell type comprises one of single port bit cells, dual port bit cells, multi-port bit cells and ROM bit cells.

19. The method according to claim 14, wherein one or both of implementing and specifying are performed according to a soft macro in an integrated circuit design flow.

20. The method according to claim 14, wherein one or both of implementing and specifying are performed so as to form the register file having a preconfigured set of one or more features.

21. The method according to claim 20, wherein the optional set of one or more features includes bit enable support.

\* \* \* \* \*